United States Patent [19]
Grajski et al.

[11] Patent Number: 5,201,292
[45] Date of Patent: Apr. 13, 1993

[54] APPARATUS AND METHOD FOR DETECTING VIBRATION PATTERNS

[75] Inventors: Kamil A. Grajski, San Jose; Carson Chen, Foster City; Garry Chinn, Los Angeles, all of Calif.

[73] Assignee: Loral Aerospace Corp., New York, N.Y.

[21] Appl. No.: 753,432

[22] Filed: Aug. 30, 1991

[51] Int. Cl.⁵ ............... F02D 41/14; F02P 5/15; G01H 17/00; G01L 23/22
[52] U.S. Cl. ............... 123/425; 73/35; 73/587
[58] Field of Search .......... 123/425, 435; 73/35, 73/587, 602, 584, 649; 364/431.08

[56] References Cited

U.S. PATENT DOCUMENTS

| | | | |
|---|---|---|---|
| 4,364,260 | 12/1982 | Chen et al. | 73/35 |
| 4,444,042 | 4/1984 | Bonitz et al. | 73/35 |
| 4,466,406 | 8/1984 | Hartung et al. | 123/425 |
| 4,637,247 | 1/1987 | Dreyer et al. | 73/35 |
| 4,738,137 | 4/1988 | Sugg et al. | 73/587 |
| 4,943,776 | 7/1990 | Polito et al. | 324/391 |
| 4,959,638 | 9/1990 | Palmer | 73/587 |
| 4,969,440 | 11/1990 | Murakami et al. | 123/425 |
| 5,101,790 | 4/1992 | Takasu et al. | 123/425 |
| 5,115,779 | 5/1992 | Itoyama | 123/425 |

Primary Examiner—Andrew M. Dolinar
Attorney, Agent, or Firm—Dennis S. Fernandez; Edward J. Radlo

[57] ABSTRACT

An electronic detection system for detecting vibration patterns from physical events, such as engine knocking or articulated speech, senses a vibration source with a wideband transducer to provide a sensed signal, then converts this signal to energy amplitude and spectral frequency form to extract detectable features of the vibration pattern. Events are detected when a controller determines that the sensed energy and spectral data exceed adaptively-predetermined energy and spectral thresholds, preferably for a duration exceeding predefined time windows.

15 Claims, 4 Drawing Sheets

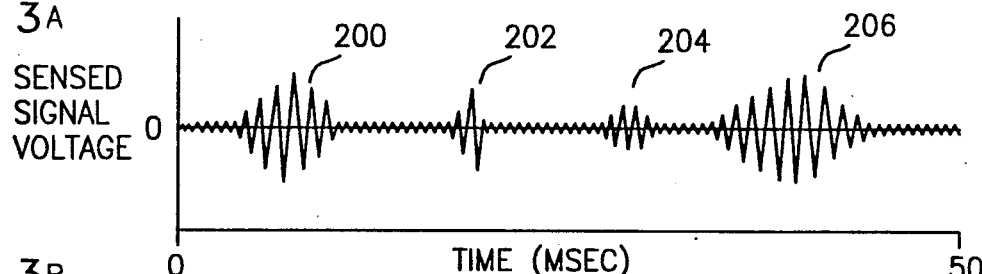
FIG. 3A SENSED SIGNAL VOLTAGE
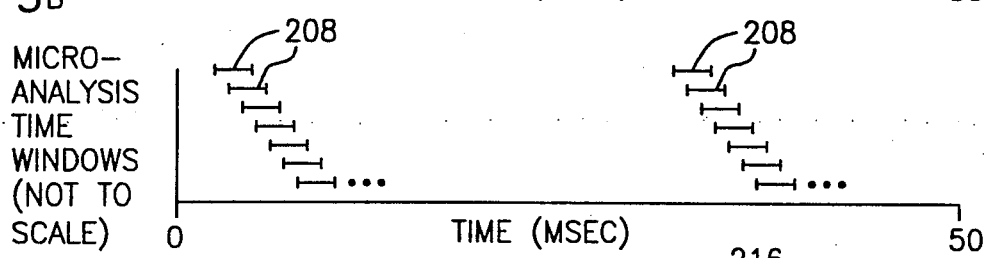
FIG. 3B MICRO-ANALYSIS TIME WINDOWS (NOT TO SCALE)
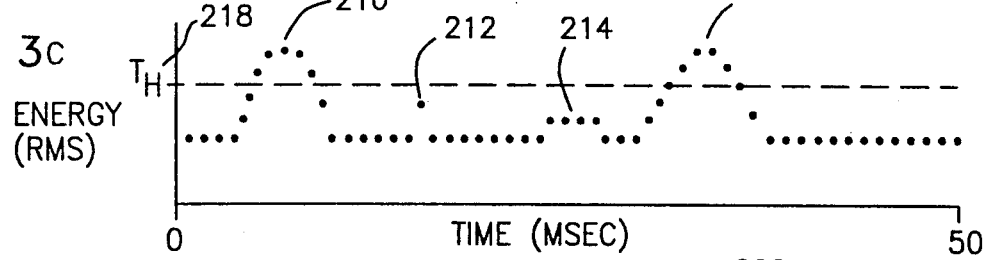
FIG. 3C ENERGY (RMS)
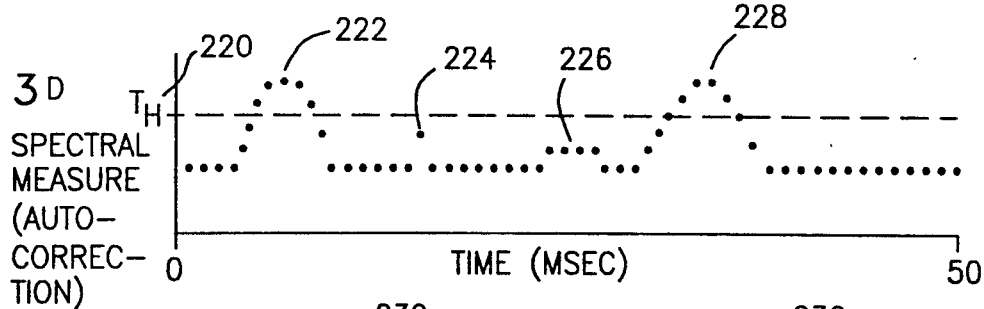
FIG. 3D SPECTRAL MEASURE (AUTO-CORRECTION)
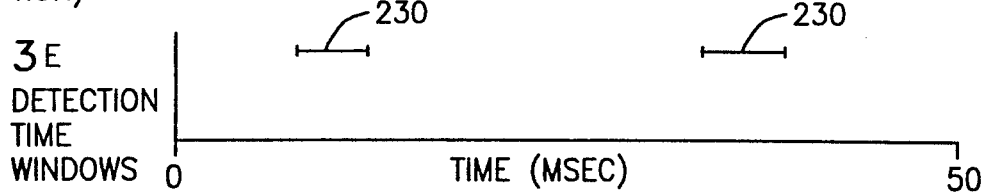
FIG. 3E DETECTION TIME WINDOWS
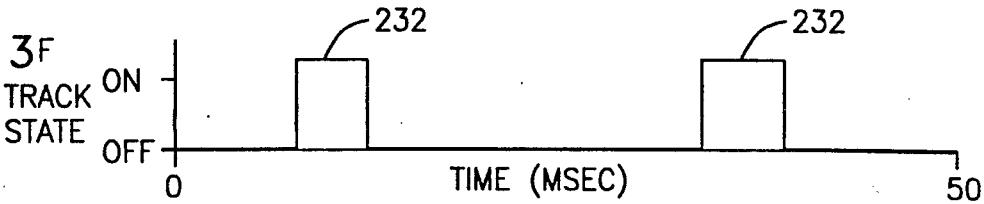
FIG. 3F TRACK STATE

APPARATUS AND METHOD FOR DETECTING VIBRATION PATTERNS

BACKGROUND OF THE INVENTION

1. Field of the Invention

This invention relates to electronic detection systems, particularly to those systems for adaptively detecting vibration patterns.

2. Description of the Background Art

Electronic detection systems are frequently used for detecting vibration patterns emitted by various sources. Typically, vibration patterns are manifested as certain audible events having identifiable characteristics. In a number of different application areas, it is useful to detect these vibration patterns in order to recognize the occurrence of particular physical events that source such vibration patterns. For instance, in the automotive engineering area, electronic knock detection systems are used to detect noise bursts, or "knocks," caused by abnormal engine combustion. By detecting these events, it is then possible to modify combustion conditions correctively and thereby reduce fuel waste and lengthen engine life.

Various knock detection systems are known, as follows: U.S. Pat. No. 4,364,260 to Chen et al. describes an engine with knock-sensing apparatus having multiple-frequency tuning. U.S. Pat. No. 4,444,042 to Bonitz et al. describes a method and apparatus for detecting engine knock. U.S. Pat. No. 4,466,406 to Hartung et al. describes a device regulating an internal combustion engine. U.S. Pat. No. 4,637,247 to Dreyer et al. describes a method and system for recognizing knock signals in an internal combustion engine. U.S. Pat. No. 4,943,776 Polito et al. describes a device and method for detecting "pinking" in controlled-ignition engines. U.S. Pat. No. 4,969,440 to Murakami et al. describes a knock-suppression apparatus for an internal combustion engine.

Known detection systems are limited, however, in their ability to detect event vibration patterns which occur under dynamic and noisy conditions.

SUMMARY OF THE INVENTION

The invention resides in adaptively detecting vibration patterns occurring during certain events, such as engine knocking. Detection may be accomplished by first sensing the source of the vibration with a wideband transducer, and then extracting from the sensed signal energy and spectral features, i.e., amplitude and frequency, about the vibration event for comparison against certain energy and spectral thresholds. These thresholds are adapted according to previously-tracked energy and spectral data, particularly, measures of the average and average variability of the extended energy and spectral features with certain threshold factors, as defined by conditions about the vibration source. Preferably, detection is further accomplished when a controller determines that the extracted energy and spectral features both exceed respective energy and spectral thresholds during a specified period.

BRIEF DESCRIPTION OF THE DRAWINGS

FIGS. 3(A)-3(F) a series of related timing diagrams A thru F showing sensed signal voltage, micro-analysis time windows, windowed energy measure, windowed spectral measure, detection time windows, and track state.

DESCRIPTION OF THE PREFERRED EMBODIMENT

Figure 1:
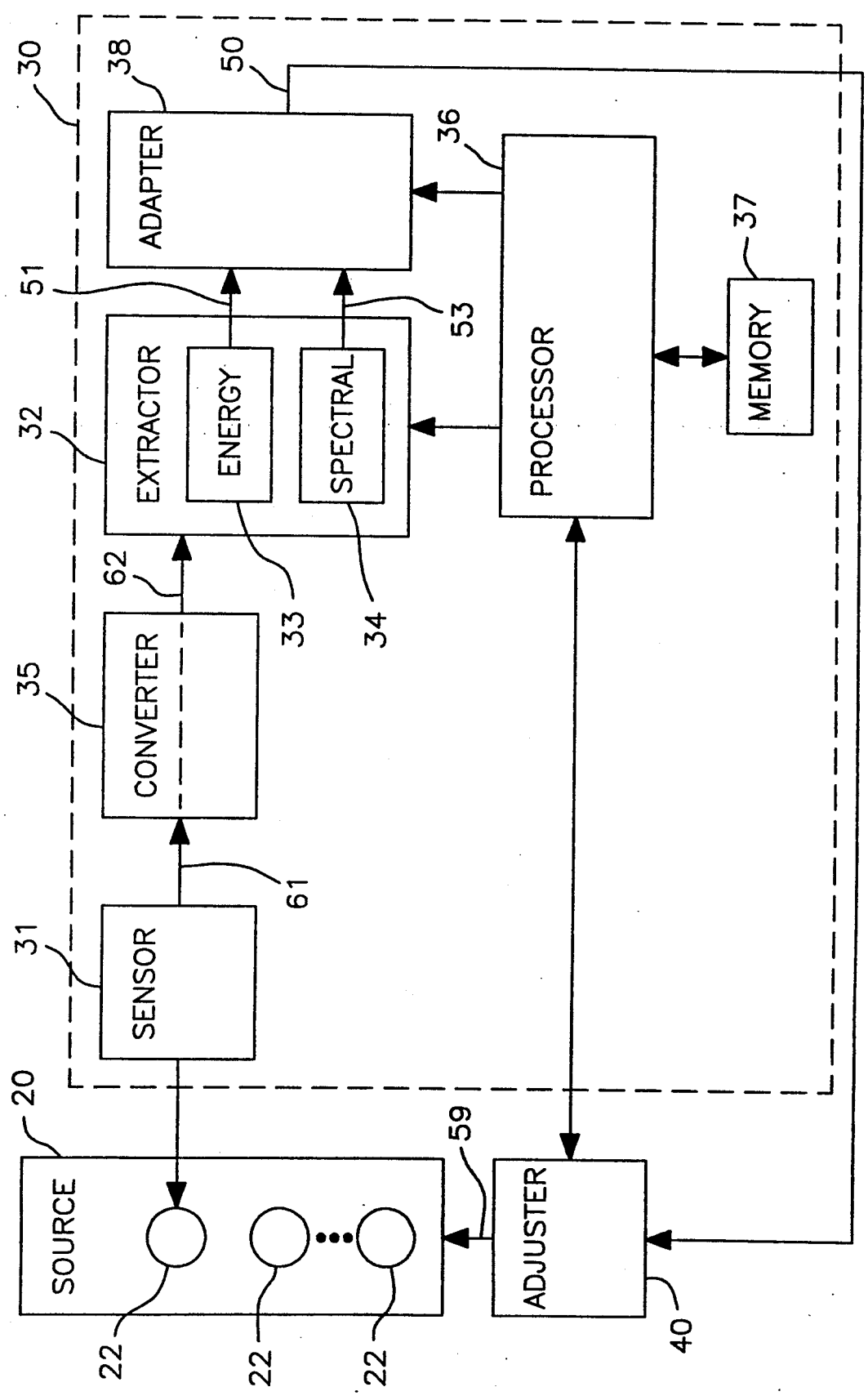
FIG. 1 is a pictorial representation of a vibration detection system 30 coupled to a vibration source 20 and an adjuster device 40. Vibration detection system 30 employs a digital extraction approach and includes a sensor 31 and a controller portion comprising a microprocessor 36, a memory 37, an analog-to-digital converter 35, an adapter routine 38, and a feature-extraction routine 32.

In FIG. 1, a preferred vibration detection system 30 is represented pictorially and coupled to a vibration source 20 and an adjuster device 40. System 30 includes a sensor 31 and a controller portion comprised of a microprocessor 36, a memory 37, an analog-to-digital (A/D) converter 35, an adapter routine 38, and a digital feature-extraction routine 32.

Figure 2:
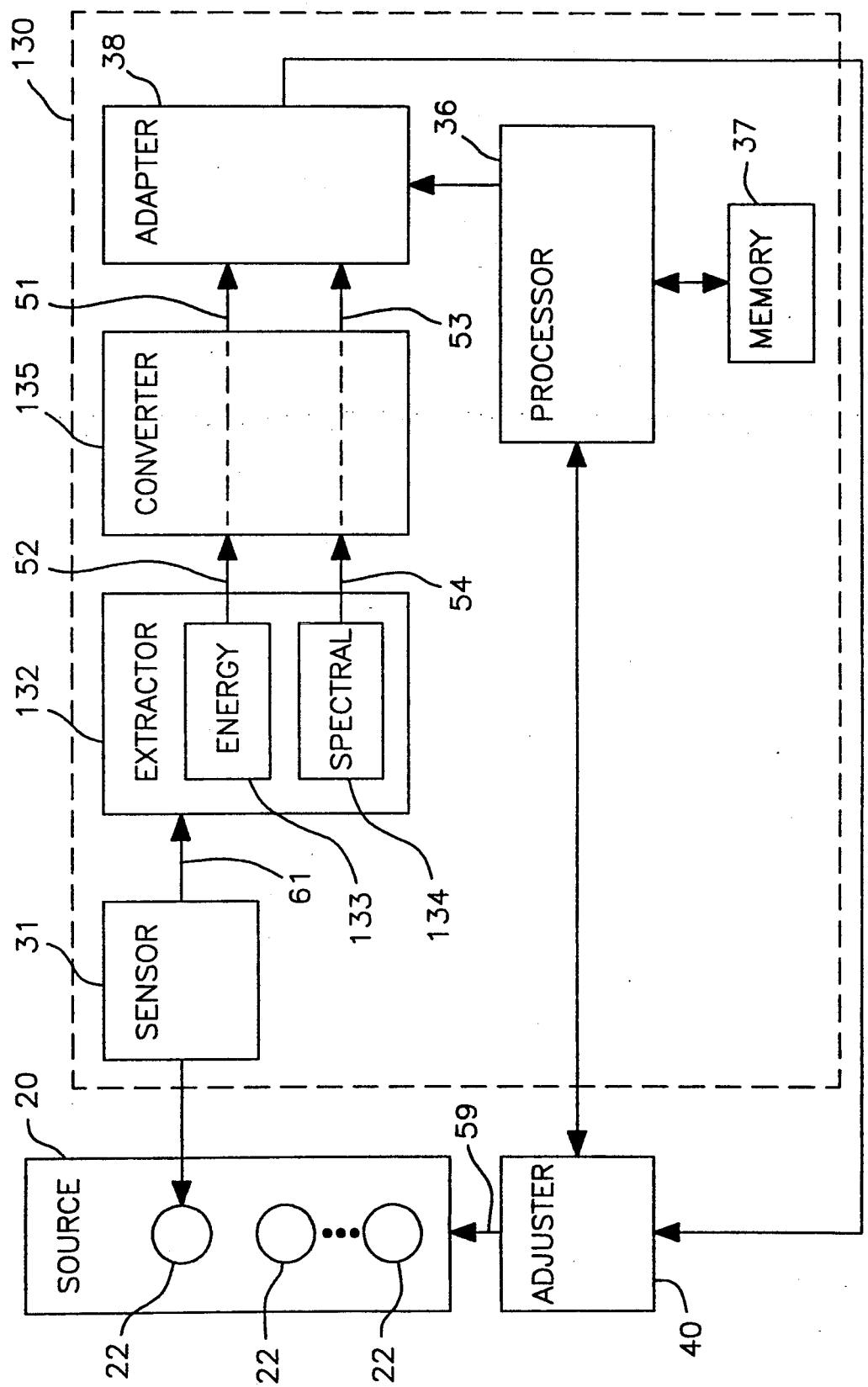
FIG. 2 is a pictorial representation of an alternative vibration detection system 130 coupled to vibration source 20 and adjuster device 40. Alternative system 130 employs an analog extraction approach and includes sensor 31 and a controller portion comprising microprocessor 36, memory 37, an analog-to-digital converter 135, adapter routine 38, and a feature extractor 132.

An alternate vibration detection system 130 is represented pictorially in FIG. 2. System 130 is similarly coupled to vibration source 20 and adjuster device 40 and includes sensor 31 and a controller portion comprised of a microprocessor 36, memory 37, an analog-to-digital (A/D) converter 135, an adapter routine 38, and an analog feature-extractor 132.

Figure 4:
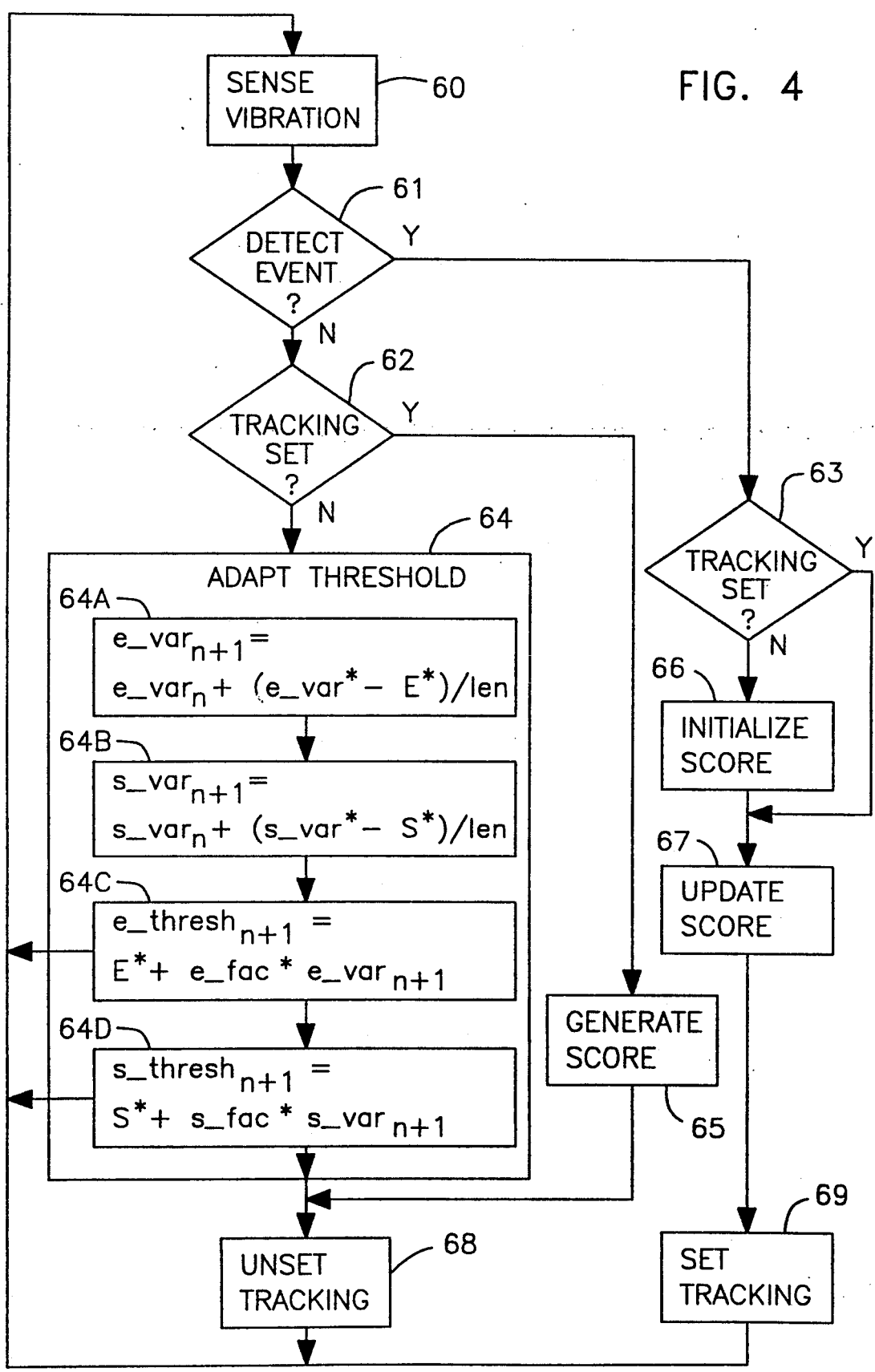
FIG. 4 is a flow chart of a method performed by vibration detection systems 30, 130 of FIGS. 1, 2 for detecting event vibration patterns.

Both systems 30, 130 are apparatus for performing a method for detecting event vibration patterns, as shown by the flow chart in FIG. 4. The detection operation of systems 30, 130 are further illustrated by related timing diagrams A thru F of FIG. 3 which depict representative noise bursts or event vibration patterns that are detected over a 50-millisecond time sample.

Preferably, the apparatus and method of the present invention are configured as a knock-detection system for adaptively detecting engine knock events caused by abnormal engine ignition. Vibration source 20 is an automobile engine having a plurality of cylinders 22. Adjuster device 40 is coupled to source 20 to apply an adjustment signal 59 for regulating combustion conditions in the engine in response to detected combustion-related factors, e.g, spark timing, air/fuel composition, and the like. Device 40 may function through an on-board automobile computer or processor 36 to monitor and control various electronic and mechanical systems in the automobile, i.e., by dynamically providing processor 36 with engine state information such as present revolutions per minute (RPM).

Additionally, it is contemplated that system 30 may be used in other applications, such as voice recognition which similarly requires the detection of voice vibration patterns. Thus, in an alternate embodiment, vibration source 20 is a voice emitter; and system 30 detects vibration patterns associated with articulated speech elements.

In accordance with an important aspect of the present invention, certain vibration patterns, such as knock events or articulated words, are detected by system 30 to provide a detected event signal 50. Preferably, signal 50 is received by device 40 for making suitable adjustments to regulate engine combustion conditions. Alternately, signal 50 is used by a speech or voice recognition system for further speech processing of detected voice patterns.

Referring now to FIG. 1, system 30 is coupled to source 20 through sensor 31. Sensor 31 is preferably a wideband accelerometer or transducer having a bandwidth of 0 to 32 KHz. At this frequency range, most knock events are likely to be detected, even for engines running at over 6,000 RPM. Sensor 31 is secured to engine source 20 at at least one of its cylinders 22. Sensor 31 detects physical vibrations and converts this mechanical energy into electrical energy in the form of an analog sensed signal 61; this step is shown by block 60 in FIG. 4. Timing diagram A of FIG. 3 shows the voltage of sensed signal 61, in particular, displaying sensed noise bursts or vibration event patterns 200, 202, 204, 206. Signal 61 is then converted to a digital signal 62 by A/D converter 35.

System 30 includes software routines 32, 38 which are stored in memory 37 and executed by processor 36 respectively for feature extraction and adaptation of certain parameters such as detection thresholds and various timing windows. Processor 36 receives digital signal 62 from converter 35 for digital processing by feature-extraction routine 32. Routine 32 includes an energy measurement subroutine 33 and a spectral measurement subroutine 34.

Each subroutine 33, 34 receives signal 62 for processing during pre-defined micro-analysis time windows 208, as shown (not to scale) in timing diagram B. Micro-analysis windows 208 are defined by temporally segmenting the processing of signal 62 into 120-microsecond windows having a 50%-overlap with temporally-adjacent micro-analysis windows 208. Preferably, the duration of micro-analysis windows 208 are adapted by processor 36 in response to engine state information from adjuster 40 to be inversely proportional to the present RPM of engine vibration source 20. Since the duration of each micro-analysis window 208 is predefined to be substantially shorter (e.g., 10–20 times) than the duration of a typical knock event (e.g., 1–2 milliseconds at 6,000 RPM, and 1–4 milliseconds at 2,000 RPM), signal 62 is oversampled to improve significantly the likelihood that vibration events having weak or fast characteristic patterns will be detected.

Subroutine 33 converts signal 62 into an energy signal 51 which represents the amplitude of signal 62 which is measured during its corresponding micro-analysis time window 208; measured energy values for signal 51 are shown in root-mean-square (RMS) units by timing diagram C. Similarly, subroutine 34 converts signal 62 into a spectral signal 53 which represents conventional auto-correlation of signal 62; measured spectral values for signal 53 are shown by timing diagram D. Alternatively, subroutine 34 performs a zero-cross detection on signal 62 to provide a lower-cost estimation for spectral signal 53.

Generally, the controller portion of system 30 in FIG. 1 processes sensed signal 61 to extract digitally energy (amplitude) and spectral (frequency) features to detect vibration patterns which indicate the occurrence of certain events such as engine knock. System 30 then provides detected event signal 50 to indicate knock detection; this step is shown by decision block 61.

In comparison to system 30, system 130 in FIG. 2 includes the same or similar parts for performing essentially the same detection task. However, system 130 extracts features using an analog approach with feature extractor 132, which does not comprise a software routine but rather conventional analog filters 133, 134. Filter 133 receives sensed signal 61 to provide analog energy signal 52. Signal 52 represents the amplitude of signal 61 as measured during its corresponding micro-analysis time window 208; measured energy values for signal 52 are shown in RMS units by timing diagram C. Moreover, filter 134 converts signal 61 into an analog spectral signal 54 which represents conventional auto-correlation of signal 61; measured spectral values for signal 54 are shown by timing diagram D. Alternatively, filter 134 may perform a zero-cross detection on signal 62 to provide a lower-cost estimation of spectral signal 54. Furthermore, in system 130, analog signals 52, 54 are converted by A/D converter 135 respectively into digital signals 51, 53.

In accordance with an essential aspect of the present invention, event vibration patterns are detected when adapter routine 38 in the controller portion of systems 30, 130 performs comparisons to determine that energy signal 51 exceeds an adaptively-predetermined energy threshold 218 and spectral signal 53 exceeds an adaptively-predetermined spectral threshold 220. Thresholds 218, 220 are determined by adapter routine 38 and stored by microprocessor 36 in memory 37 coupled thereto.

Energy threshold 218 is shown by timing diagram C and determined as the sum of the (weighted) mean of energy signal 51 and the product of the weighted variance of energy signal 51 and an energy threshold factor (e_fac), where e_fac is defined by microprocessor 36 as a function of vibration source conditions (e.g., engine type, engine age, cylinder configuration, crank angle, torque loading, air/fuel composition, present RPM, etc.) Instead of calculating the variance of energy signal 51, the absolute deviation of signal 51, as weighted over time, may be calculated in determining energy threshold 218.

Spectral threshold 220 is shown by timing diagram D and determined as the sum of the (weighted) mean of spectral signal 53 and the product of the (weighted) variance of spectral signal 53 and a spectral threshold factor (s_fac), where s_fac is defined by microprocessor 36 as a function of vibration source conditions (e.g., engine type, engine age, cylinder configuration, crank angle, torque loading, air/fuel composition, present RPM, etc.). Similarly, instead of calculating the variance of spectral signal 53, the absolute deviation of signal 53, as weighted over time, may be calculated in determining spectral threshold 220. These steps are shown in block 64 and explained later in detail.

Furthermore, event vibration pattern detection may be defined to occur when adapter routine 38 determines that, for at least the two most recent temporally-adjacent microanalysis windows 208, energy signal 51 has exceeded energy threshold 218, as shown by measured energy values 210, 216 in timing diagram C; and spectral signal 53 has exceeded spectral threshold 220, as shown by measured spectral values 222, 228. Relatively short or weak vibration event patterns 202, 204 which do not result in energy values 212, 214 or spectral values 224, 226 being measured to exceed detection thesholds 218, 220 are not detected as candidate knock events.

When certain event vibration patterns 200, 206 are detected, a tracking state 232 is initiated (i.e., set "ON") by microprocessor 36 by setting a tracking flag in memory 37; this step is shown by block 69 and further illustrated by timing diagram F. Such initiation defines the beginning of predefined detection time windows 230, as shown by timing diagram E. Preferably, adapter routine 38 determines thesholds 218, 220 when tracking state 232 is set ON.

During each detection window 230, microprocessor 36 accumulates a score for detected event vibration patterns 200, 206. This accumulated score includes the duration of each detection window 230 and the total energy values 210, 216 and weighted average of spectral values 222, 228 which are associated with each tracked event 200, 206. Additionally, this accumulated score is stored by microprocessor in memory 37 and provided in sensed signal 50.

Whether or not an event vibration pattern is detected, microprocessor 36 checks memory 37 for the status of the tracking flag; this step is shown by decision blocks 62, 63. Thus, if microprocessor 36 determines that system 30 is presently tracking a previous or current event vibration pattern, then microprocessor 36 either generates the accumulated score for the previously-detected event vibration pattern (i.e., when no event vibration pattern is presently detected at decision block 61), or updates the accumulated score from the present event vibration pattern (i.e., when an event vibration pattern is presently detected); these steps are shown respectively by blocks 65, 67.

However, if no event vibration pattern is detected and the tracking flag is not set, microprocessor 36 adapts statistical data about vibration source 20 noise event patterns or engine knocking history, e.g., energy and spectral thresholds 218, 220 stored in memory 37. In particular, microprocessor 36 adapts such data by defining new threshold values (i.e., e_thresh, s_thresh) according to previously-stored threshhold values and dynamically-obtained engine state or vibration source 20 conditions; this step is shown by sub-blocks 64A to 64D, as follows:

$$e\_var_{n+1} = e\_var_n + (e\_var^* - E^*) / len \quad \text{64A}$$

$$s\_var_{n+1} = s\_var_n + (s\_var^* - S^*) / len \quad \text{64B}$$

$$e\_thresh_{n+1} = E^* + e\_fac * e\_var_{n+1} \quad \text{64C}$$

$$s\_thresh_{n+1} = S^* + s\_fac * s\_var_{n+1} \quad \text{64D}$$

Where $e\_var_{n+1}$ is the updated estimate of extracted energy signal variance; $e\_var_n$ is the current estimate of extracted energy signal variance; $e\_var^*$ is the estimate of sensed signal amplitude variance cumulated and weighted over the micro-analysis time window; E is the estimate of extracted energy signal mean, cumulated and weighted over time. Where $s\_var_{n+1}$ is the updated estimate of extracted spectral signal variance; $s\_var_n$ is the current estimate of extracted spectral signal variance; $s\_var^*$ is the estimate of sensed signal amplitude variance cumulated and weighted over the micro-analysis time window; S is the estimate of extracted spectral signal mean, cumulated and weighted over time. Energy and spectral threshold factors, e_fac and s_fac, were discussed earlier. Thus, at sub-blocks 64C, 64D, processor 36 causes adapter routine 38 to adapt energy and spectral thesholds 218, 220.

After thesholds 218, 220 are adapted at sub-blocks 64C, 64D, microprocessor 36 terminates the tracking state by toggling the tracking flag in memory 37 appropriately (i.e., set "OFF".) This termination defines the end of detection time window 230, as shown by block 68. Preferably, the duration of detection window 230 is greater than the duration for a typical, anticipated knock event (e.g., 1–5 milliseconds), but less than a specified upper limit (e.g., 50 milliseconds), which may indicate unusual delay due to faulty detection.

If an event vibration pattern is detected and the tracking flag is not set, then microprocessor 36 initializes the accumulated score for a new event vibration pattern according to predetermined initialization values for energy and spectral thresholds 218, 220 which are stored in memory 37. Preferably, initialization energy and spectral values are adapted separately in proportion to engine RPM, as provided by adjuster 40 to processor 36; this step is shown by block 66.

The above description is included to illustrate the operation of the preferred embodiments and is not meant to limit the scope of the invention. The scope of the invention is to be delimited only by the following claims. From the above discussion, many variations will be apparent to one skilled in the art that would yet be encompassed by the true spirit and scope of the invention.

We claim:

1. An apparatus for detecting event vibration patterns from a vibration source comprising:

sensing means coupled to the vibration source for producing in response to sensing vibration from the vibration source a sensed signal; and controlling means, coupled to the sensing means, for receiving the sensed signal to provide a detected event signal;

wherein said controlling means comprises feature extracting means coupled to the sensing means for converting the sensed signal into an energy signal and a spectral signal; said controlling means disposed for adaptively processing said energy signal and said spectral signal separately to detect an event vibration pattern and provide said detected event signal in response to said controlling means comparing said energy signal to a predetermined energy threshold and comparing said spectral signal to a predetermined spectral threshold; said energy and spectral thresholds being adapted dynamically according to vibration source conditions.

2. The apparatus in claim 1, wherein said predetermined energy threshold is defined by the sum of the mean of the energy signal and the product of the variance of the energy signal and an energy threshold factor, where such energy threshold factor is defined by the controlling means as a function of vibration source conditions.

3. The apparatus in claim 1, wherein said predetermined spectral threshold is defined by the sum of the mean of the spectral signal and the product of the variance of the spectral signal and a spectral threshold factor, where such spectral threshold factor is defined by the controlling means as a function of vibration source conditions.

4. The apparatus in claim 1, wherein said controlling means segments the energy signal and the spectral signal for processing within adaptively-predefined analysis time windows.

5. The apparatus in claim 4, wherein the analysis time windows overlap with temporally-adjacent analysis time windows, and the duration of each analysis time window is substantially shorter than the duration of the event vibration pattern.

6. The apparatus in claim 5, wherein said pattern detection occurs in response to said controlling means determining that, for at least the two most recent temporally-adjacent analysis time windows, said energy signal exceeds the predetermined energy threshold and said spectral energy exceeds the predetermined spectral threshold.

7. The apparatus in claim 1, wherein said controlling means initiates a tracking state upon detecting the event vibration pattern, said initiation of tracking state defining the beginning of a predefined detection time window during which said controlling means accumulates a score of detected event vibration patterns, such score being included in the detected event signal.

8. The apparatus in claim 1, wherein said controlling means, upon not detecting the event vibration pattern, adapts new energy and spectral thresholds according to predetermined energy and spectral thresholds and present vibration source conditions.

9. The apparatus in claim 1, wherein said feature-extracting means provides the energy signal by performing an auto-correlation function digitally on the sensed signal.

10. The apparatus in claim 1, wherein said feature extracting means provides the energy signal by performing a zero-cross detection function digitally on the sensed signal.

11. The apparatus in claim 1, wherein said controlling means further comprises:
a converter, coupled to the feature-extracting means, for converting the energy signal and spectral signal respectively into a digital energy signal and a digital spectral signal;
a microprocessor, coupled to the converter, for processing the digital energy signal and spectral signal; and
a memory, coupled to the microprocessor, for storing the energy and spectral thresholds.

12. The apparatus in claim 1, wherein the vibration source to which the sensing means and the feature-extracting means are coupled comprises a cylinder in a combustion engine, and the event vibration pattern detected by the controlling means comprises a knock event which occurs during abnormal combustion in the cylinder.

13. The apparatus in claim 12, further comprising an adjusting means, coupled to the controlling means and the engine, wherein the detected event signal provided by the controlling means comprises a knock score which is applied by the controlling means to the adjusting means for regulating combustion conditions in the cylinder and reducing the occurrence of knock events.

14. The apparatus in claim 12, wherein said sensing means comprises a wideband transducer, coupled to the cylinder, said transducer having a bandwidth of 0 to 32 KHz.

15. A method for detecting event vibration patterns from a vibration source, the method comprising the steps of:
sensing vibration from the vibration source with the sensor to provide a sensed signal;
converting the sensed signal separately into an energy signal and a spectral signal;
processing said energy signal and said spectral signal to detect an event vibration pattern in response to said energy signal exceeding an adaptively-predetermined energy threshold and said spectral signal exceeding an adaptively-predetermined spectral threshold, said energy and spectral thresholds being dynamically pre-determined in response to present vibration source conditions; and
producing a detected event signal in response to detecting the event vibration pattern.

* * * * *